June 12, 1928.

Re. 16,995

F. HACHMANN

RAIL JACK

Original Filed March 20, 1922

INVENTOR

Frederick Hachmann

BY Charles W. Hills

ATTY

Reissued June 12, 1928.

Re. 16,995

UNITED STATES PATENT OFFICE.

FREDERICK HACHMANN, OF CHICAGO, ILLINOIS, ASSIGNOR, BY MESNE ASSIGNMENTS, OF NINE-TENTHS TO JOSEPH J. FRANZEN, OF CHICAGO, ILLINOIS.

RAIL JACK.

Original No. 1,461,186, dated July 10, 1923, Serial No. 545,073, filed March 20, 1922. Application for reissue filed July 9, 1925. Serial No. 42,554.

My invention relates to certain new and useful improvements in rail jacks, and has for its primary object the construction of a jack for moving and alining railway rails, the primary object of which is to construct a jack with a strong fulcrum or pivotal connection between the base and lever; and further, to provide such a connection between the lever and base that the entire device may be carried by the handle without any danger of the base being separated from the lever.

Figure 1:
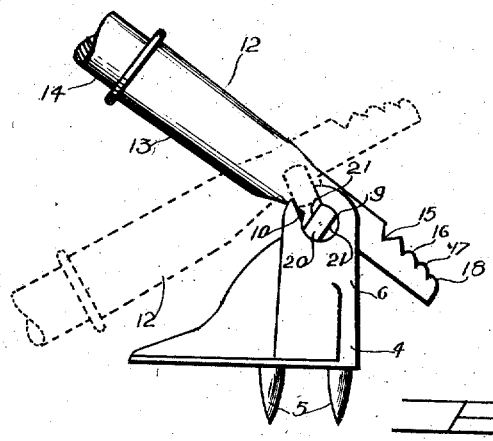
Figure 1 is a side elevation of my improved jack, showing the device adjusted so as to be inserted under the ball of a railway rail.
Figure 2:
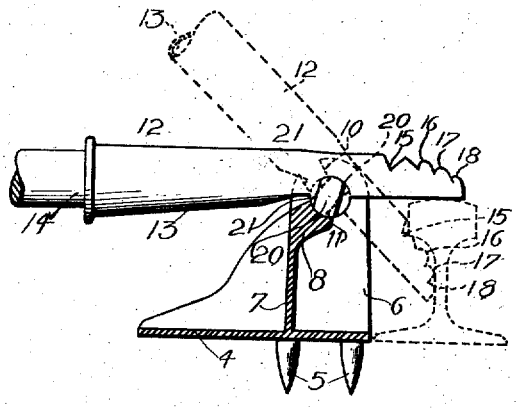
Figure 2 is a section taken on the line 2—2 of Figure 3, looking in the direction of the arrows, the application of the jack to the ball of a railway rail being shown in dotted lines.
Figure 3:
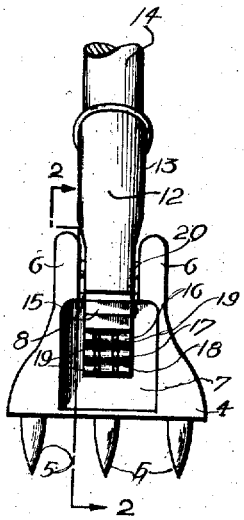
Figure 3 is a front view with the handle and lever in an elevated position.

Referring to the drawings:

4 indicates the base or support which is preferably cast and formed on the under surface thereof are prongs 5 which are intended to prevent the jack from slipping when in use. The base or support 4 is provided with upstanding side portions 6 which are connected by means of a web 7. The web 7 is substantially vertical, except the upper portion 8, which inclines in a forward direction. Formed in each of the upstanding side portions 6 are circular bearings 9, and rearwardly inclined slots or openings 10 which lead into said bearings. Formed in the forward projecting portion 8 is a curved bearing 11 having the same degree of curvature as the bearings 9. The bearings 9 in each of the upstanding portions 6 and the bearing 11 form a continuous bearing throughout the width of the support. 12 indicates a lever which has a hollow portion 13 into which a handle 14 is inserted. The portion 13 is provided with a shoulder 15 which is adapted to engage the ball of the rail, as illustrated in dotted lines in Figure 2. Formed forward of the shoulder 15 are a series of smaller shoulders 16, 17 and 18. The shoulders 15 and 16 are especially designed to engage with the ball of the rail in the operation of the device.

In the operation of the device, should the shoulders 15 become disengaged with the ball of the rail, the ball will catch on the shoulder 16 and tend to move the rail further. The shoulders or ribs 17 and 18 are designed to engage the web of the rail. The shoulders 16 and 17 are intersected by grooves 19 which have a tendency to prevent the lever from slipping laterally on the web. Formed integral with the lever and on the rear side thereof is an arcuate faced bearing lug 20, the ends of which project beyond the lever and have flattened faces 21. These flattened portions are of the width of the inclined slots 10.

In assembling the lever with the base or support, the lever 12 is adjusted in position so that the flattened portions will pass into the openings 10. In order to remove the lever from the base or support, the lever must be adjusted so that the flattened portions may be removed through these inclined slots.

It will be seen from this construction that the entire jack may be carried by the handle, as illustrated in Fig. 1, and the support will not become detached from the lever. Furthermore it will be noted that the transverse web 7 limits the rearward movement of the lower rail engaging portion of the lever, thus preventing the lever handle from falling forward onto the tracks out of the hands of the operator.

When my device is in operation, (see Fig. 2 for illustration) it will be observed that the entire lifting strain will be first received by the arcuate bearing 20, and will be transmitted against the forwardly inclined portion 8, and thence to the web 7,—the web 7 being strengthened by the side portions 6. Thus it will be seen that I provide a very strong and serviceable jack capable of standing any strain encountered in alining or straightening tracks.

Having fully described my invention, what I claim is:

1. A jack comprising a support having a substantially vertical web, an arc-shaped bearing formed throughout the web, said bearing being provided with rearwardly inclined slots, a lever provided with an integral bearing lug adapted to be seated on the bearing formed in the web, and a series of transverse shoulders formed on the forward end of said lever, certain of said shoulders being adapted to engage beneath the ball of a rail, and the others to engage the web thereof.

2. A jack comprising a base having vertical extending side walls, a web formed integral and between said walls, an arc-shaped bearing formed in the walls and the web, said walls being provided with rearwardly inclined slots, a lever provided with an arcuate bearing and flattened terminal portions arranged to pass through said slots, said lever being provided on its forward and upper surface with a series of transverse shoulders, certain of which are arranged to engage the ball of the rail, and the others, the web thereof.

3. A jack comprising a base having side walls, a web formed between and integral with said side walls and having an upper portion extending forwardly at an angle to said web, said forwardly extending portion and the side walls being provided with an arcuate bearing, there being rearwardly inclined slots formed in the side walls, a lever having a hollow portion adapted to receive a handle, and having a forward portion provided with a series of transverse shoulders, an arcuate faced bearing lug formed integral with said lever and provided with flattened end portions adapted to be passed through the inclined slots formed in the side portions.

4. In a rail aligning jack, a base having upstanding side portions and a transverse web joining said side portions and rising from the base at a point rearwardly of the front of the base and said side portions, said side portions having bearing sockets formed therein, and a rail engaging lever having bearing lugs fulcrumed in said sockets for operation of said lever, the rearward movement of the rail engaging portion of said lever being limited by said transverse web.

5. In a rail alining jack, a base, side walls upstanding from the base in parallel spaced-apart relation, an upright transverse web joining the side walls, said side walls having bearing sockets formed in their upper forward portions, and a rail engaging lever having bearing legs movable in said recesses, said web extending between said side walls at a point intermediate the ends of the walls and serving to reenforce the same and limit rearward movement of the forward end of the rail engaging lever.

In testimony whereof, I have hereunto subscribed my name.

FREDERICK HACHMANN.